(No Model.)
O. H. JEWELL.
FILTER.
No. 477,213. Patented June 21, 1892.
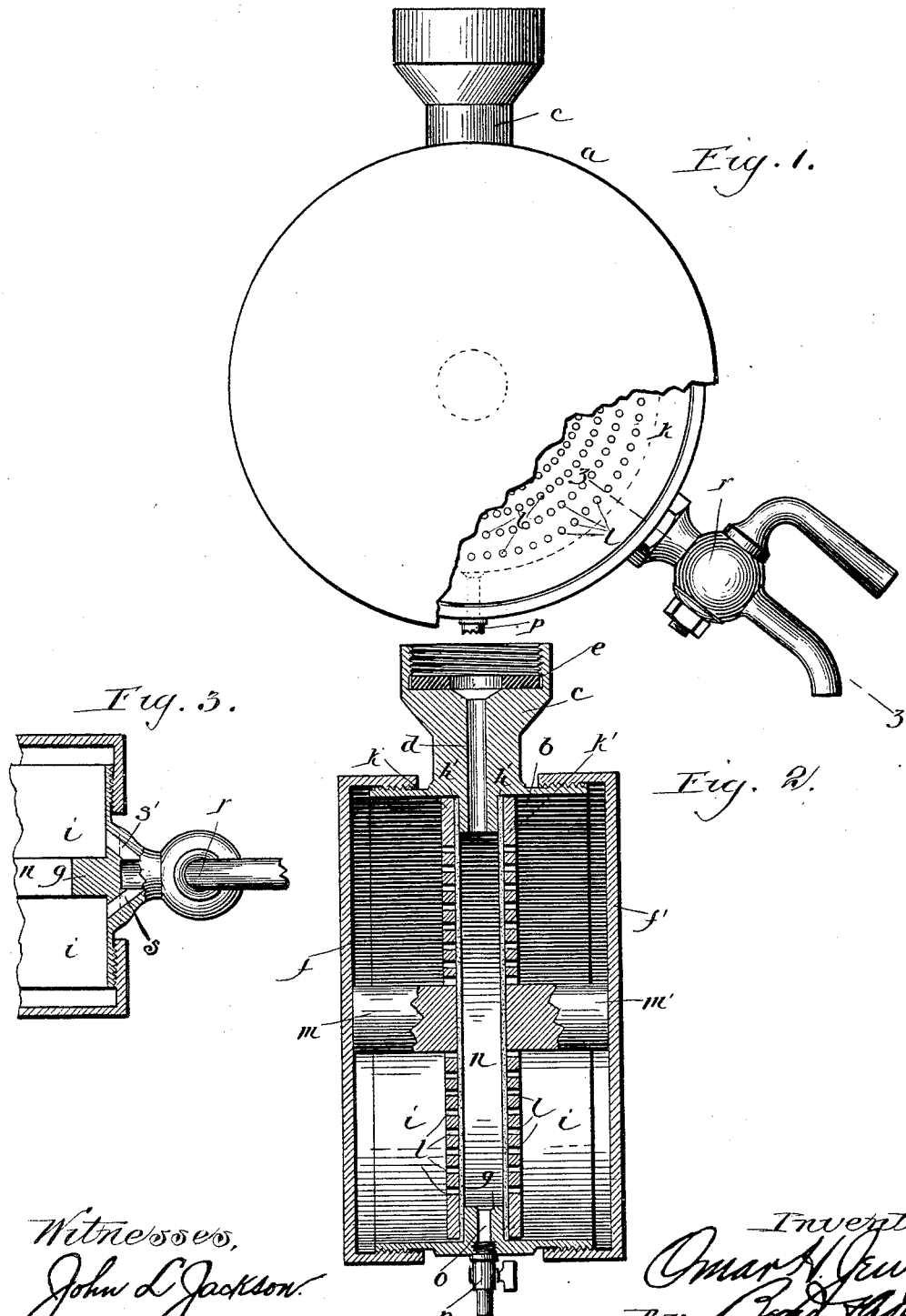
Witnesses,
John L. Jackson.
Nellie McKibben.
Inventor
Omar H. Jewell
By Bond & Adams,
Attys.

UNITED STATES PATENT OFFICE.

OMAR H. JEWELL, OF CHICAGO, ILLINOIS.

FILTER.

SPECIFICATION forming part of Letters Patent No. 477,213, dated June 21, 1892.

Application filed September 14, 1891. Serial No. 405,580. (No model.)

*To all whom it may concern:*

Be it known that I, OMAR H. JEWELL, a citizen of the United States, residing at Chicago, in the county of Cook and State of Illinois, have invented certain new and useful Improvements in Filters, of which the following is a specification, reference being had to the accompanying drawings, in which—

Figure 1 is a side elevation, a portion of one side being broken away. Fig. 2 is a central vertical cross-section; and Fig. 3 is a detail, being a partial sectional view on line 3 3 of Fig. 1.

My invention relates to filters, and more particularly to that class of filters which are adapted to be attached to a faucet to filter all the water which passes through the faucet.

The object of my invention is to provide an improved filter of the above description which will be simple in construction, efficient, and inexpensive. I accomplish this object as illustrated in the drawings and as hereinafter specified. That which I regard as new will be pointed out in the claim.

In the drawings, $a$ indicates the filter.

$b$ indicates the cylindrical shell, which is adapted to hold the filtering material and which is made of brass or any other suitable metal. The shell $b$ is provided at a suitable point on its periphery with a boss $c$, having a channel $d$ for the passage of unfiltered water to the interior of the shell. The boss $c$ is screw-threaded at its upper end to adapt it to be screwed upon a water-faucet. A rubber or leather washer $e$ is placed in the upper end of the boss $c$, in order that a water-tight joint may be made when the filter is screwed upon the faucet.

$f\ f'$ indicate caps, which are adapted to screw upon the opposite ends of the cylindrical shell $b$, as best shown in Fig. 2.

$g$ indicates an annular flange formed centrally in the shell $b$ to form shoulders upon which the filtering material may rest.

$h\ h'$ indicate disks of filtering material, which are adapted to fit into the shell $b$ and to rest upon the shoulders formed by the flange $g$. The filtering substance is some fibrous material, preferably filter-paper.

The filtering material is held in position by means of perforated metal disks $k\ k'$, which fit into the shell $b$ and are adapted to press the edges of the filtering material against the annular flange $g$. The disks $k\ k'$ are provided with perforations $l$ and with bosses $m\ m'$. The bosses $m\ m'$ project centrally from the disks $k\ k'$ and are adapted to bear against the inner surface of the caps $f\ f'$ when said caps are screwed upon the shell $b$, as shown in Fig. 2. The arrangement is such that by screwing the caps upon the cylinder the disks $k\ k'$ may be held tightly upon the filtering material to prevent its being displaced. By this construction chambers $i$ are formed at each end of the shell $b$, between the caps $f\ f'$ and the filtering material $h\ h'$, which chambers serve as reservoirs to hold the filtered water. The flange $g$ is of such width that when the filtering material and disks are in place a central unobstructed chamber $n$ will be formed between them, and the channel or inlet-pipe $d$ is so placed as to conduct the water into said chamber.

$o$ indicates an outlet-passage provided with a stop-cock $p$. The passage $o$ leads from the central chamber $n$ through the flange $g$ of the shell $b$, and this passage $o$ and cock or valve $p$ are at the bottom of the shell opposite the inlet-channel $d$ when the filter is in use. As the central chamber is unobstructed interiorly, the sediment or impurities collected in such chamber can be quickly washed out at any time by simply opening the cock or valve $p$ and permitting the water to flow in through the passage $d$.

$r$ indicates a discharge-cock, which communicates with the chambers $i$ through passages $s\ s'$, as best shown in Fig. 3. The passages $s\ s'$ are so placed as to open into the lower portion of the chambers $i$.

The operation of my improved filter is as follows: The unfiltered water passes into the chamber $n$ through the passage $d$, and then filters through the filtering material into the chamber $i$. It may then be drawn off through the cock $r$. The impurities in the unfiltered water are deposited upon the inner surfaces of the disks $h\ h'$. The impurities may be washed off of the disks by opening the cock $p$, when the water will flow through the chamber $n$ and be discharged through the passage $o$ and cock $p$ without passing through the filter-paper. When it is desired to replace the filtering material with fresh filter-paper, the caps $ff'$ may be removed, when by removing the disks $k\,k'$ the filtering material may be readily removed and replaced.

That which I claim as new, and desire to secure by Letters Patent, is—

A filter consisting of a cylindrical shell having its opposite ends screw-threaded externally and provided with an internal annular flange $g$, screw-caps $f\,f'$, screwing on the threaded ends of the shell, filtering material supported by the said annular flange, and perforated disks $k\,k'$, resting against the filtering material and having laterally-projecting bosses $m\,m'$, bearing, respectively, against the screw-caps, so that by screwing up said caps the perforated disks are tightened against the annular flange, substantially as described.

OMAR H. JEWELL.

Witnesses:
W. B. JOHNSON,
JOHN C. CAHALAN.